United States Patent [19]
Suzuki

[11] Patent Number: 5,298,568
[45] Date of Patent: Mar. 29, 1994

[54] MODIFIED OLEFIN RESIN AND RESIN COMPOSITION

[75] Inventor: Yoshiko Suzuki, Tokyo, Japan

[73] Assignee: Toyo Ink Manufacturing Co., Ltd., Tokyo, Japan

[21] Appl. No.: 86,375

[22] Filed: Jul. 6, 1993

Related U.S. Application Data

[62] Division of Ser. No. 830,323, Jan. 31, 1992, abandoned.

[51] Int. Cl.$^5$ ............................................. C08F 8/32
[52] U.S. Cl. .............................. 525/327.6; 525/327.7; 525/379; 525/384
[58] Field of Search ........................ 525/327.6, 327.7

[56] References Cited

U.S. PATENT DOCUMENTS

| | | | |
|---|---|---|---|
| 4,130,213 | 12/1978 | Wszolek | 525/327.7 |
| 4,433,113 | 2/1984 | Woodward et al. | 525/327.6 |
| 4,775,723 | 10/1988 | Kuhne | 525/327.7 |
| 4,975,489 | 12/1990 | Kazmierzak et al. | 525/327.6 |
| 5,166,272 | 11/1992 | Burks et al. | 525/327.6 |

*Primary Examiner*—Bernard Lipman
*Attorney, Agent, or Firm*—Wenderoth, Lind & Ponack

[57] ABSTRACT

A modified olefin resin which can be dissolved in water by neutralization with an alkali and has an acid value of at least 30, produced by reacting a copolymer obtained from an α-olefin having at least 6 carbon atoms and maleic anhydride with at least one modifier having at least one functional group selected from the class consisting of hydroxyl, amino, aziridinyl and mercapto groups.

4 Claims, 1 Drawing Sheet

MODIFIED OLEFIN RESIN AND RESIN COMPOSITION

This application is a division of now abandoned application Ser. No. 07/830,323, filed Jan. 31, 1992.

FIELD OF THE INVENTION

The present invention relates to a novel modified olefin resin which is excellent in alkali solubility, hot-meltability and pigment dispersibility and can be used in an alkali-soluble hot-melt adhesive, a water-soluble or water-dispersible (to be referred to as "water-compatible" hereinafter) adhesive, a water-compatible ink and a water-compatible coating composition. The present invention also relates to a resin composition containing the above modified olefin resin.

PRIOR ART OF THE INVENTION

In recent years, environmental protection is a serious problem, and the recycling of resources is strongly desired. For example, the recycling of waste paper is an especially important subject. At present, corrugated paper is mostly collected and reproduced into thin paper. Since, however, an acrylic adhesive or a conventional hot-melt adhesive generally used on corrugated paper is not resoluble in an alkaline aqueous solution, the adhesive is removed with much difficulty when paper is reclaimed from waste corrugated paper. It is therefore desired to develop a hot-melt or water-compatible adhesive which has excellent adhesiveness and is soluble in an alkaline solution.

A water-compatible ink and a water-compatible coating composition contain a water-compatible emulsifier having good pigment dispersibility, a water-soluble acrylic resin or a water-soluble polyester resin. However, a general water-compatible emulsifier is very inferior in water resistance. With a water-soluble acrylic resin or a water-soluble polyester resin, there is a defect in that in order to improve the pigment dispersibility, it is required to select a composition of the resin, for example, copolymerization with a monomer having a specific functional group and adjustment of the molecular weight of the resin.

SUMMARY OF THE INVENTION

It is an object of the present invention to provide a modified olefin resin which is excellent in all of alkali-solubility, hot-meltability and pigment dispersion.

It is another object of the present invention to provide a hot-melt adhesive having excellent adhesiveness and which is soluble in an alkali, a water-compatible adhesive having hot-meltability, a water-compatible ink having excellent pigment dispersibility and a modified olefin resin suitable as a material for producing a water-compatible coating composition.

It is further another object of the present invention to provide a hot-melt adhesive, a water-compatible adhesive having hot-meltability, a water-compatible ink and a resin composition suitable as a material for producing a water-compatible coating composition, each of which suitably contains a modified olefin resin, a transition metal compound having a valence of 2 or more, an olefin resin and a tackifier in combination.

According to the present invention, there is provided a modified olefin resin which is capable of being water-compatible by neutralization with an alkali and having an acid value of at least 30, which is produced by reacting a copolymer obtained from an α-olefin having at least 6 carbon atoms and maleic anhydride with at least one modifier having at least one functional group selected from the class consisting of hydroxyl, amino, aziridinyl and mercapto groups.

Further, according to the present invention, there is provided a resin composition produced by polymerization of a monomer having an α, β-unsaturated double bond, which excludes α-olefin having at least 6 carbon atoms and maleic anhydride, in the presence of the above modified olefin resin.

DETAILED DESCRIPTION OF THE INVENTION

Figure 1:
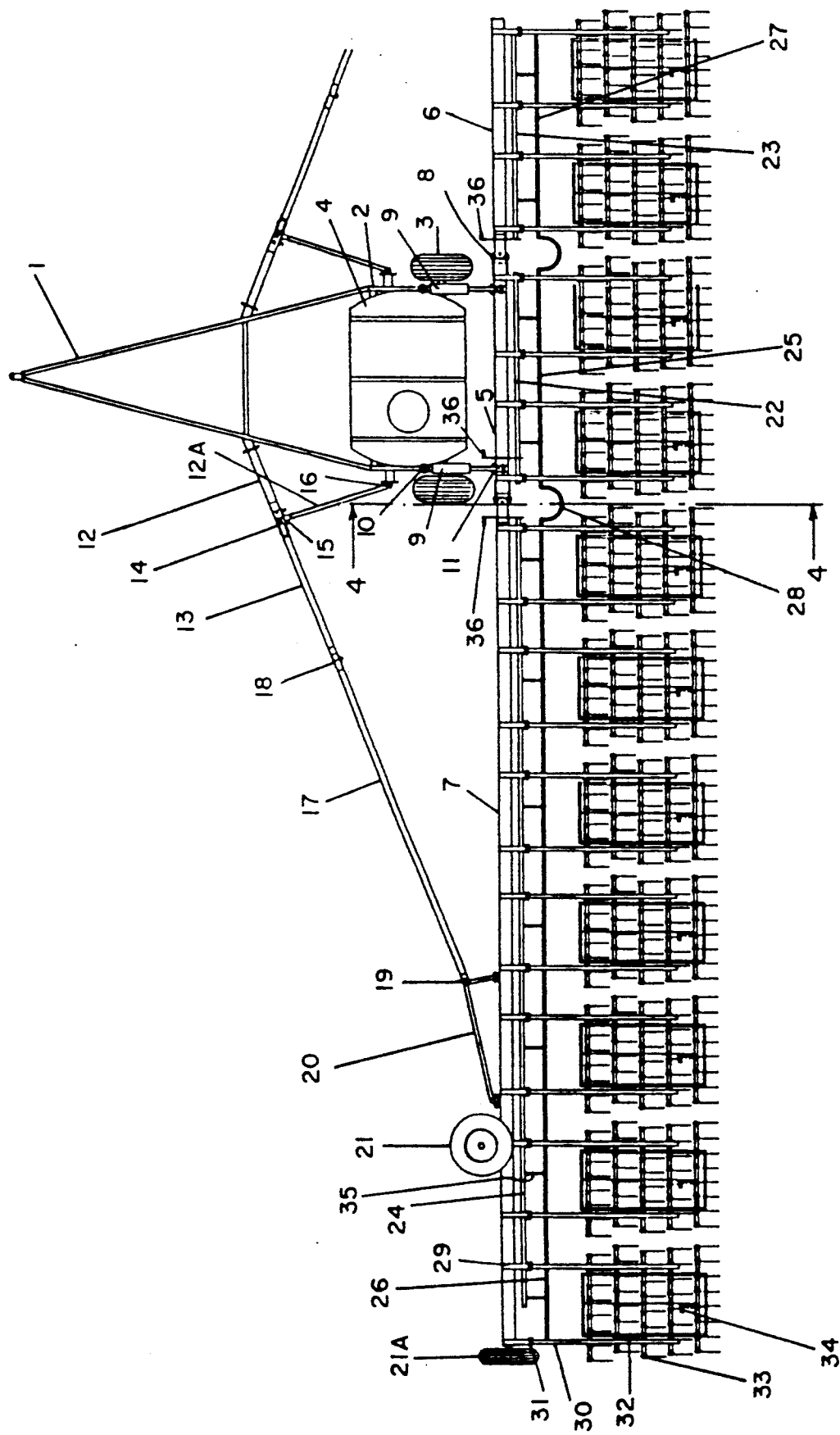

In the copolymer obtained from α-olefin and maleic anhydride (α-olefin/maleic anhydride copolymer), the α-olefin includes 1-hexene, 1-heptene, 1-octene, 1-nonene, 1-decene, 1-dodecene, 1-tetradecene, 1-hexadecene, 1-octadecene, 1-eicosene, 1-docosene, 1-tetraeicosene, 1-hexaeicosene, 1-octaeicosene, 1-triacontene, 1-dotriacontene, 1-tetratriacontene, 1-hexatriacontene, 1-octatriacontene and 1-tetracontene. These α-olefins may be used alone or in combination. Further, commercially available α-olefin mixtures such as DIALEN 208 (having 20 to 28 carbon atoms and DIALEN 30 (having 30 or more carbon atoms) may be used. Preferred are α-olefins having 10 or more carbon atoms. Although not specially limited, the α-olefin/maleic anhydride molar ratio is preferably 1/1.

The α-olefin and maleic anhydride may be copolymerized in the absence or presence of a solvent. The α-olefin and maleic anhydride may be simultaneously charged to a reactor, or maleic anhydride may be gradually added to the polymerization system. The method for polymerization of the α-olefin and maleic anhydride is not specially limited. For the polymerization, a polymerization initiator is used. The polymerization initiator is selected from azobis compounds such as azobisisobutyronitrile and azobis-2,4-dimethylvaleronitrile; and peroxides such as cumene hydroperoxide, tert-butyl hydroperoxide, benzoyl peroxide, diisopropyl peroxycarbonate, di-tert-butyl peroxide, lauroyl peroxide and tert-butyl peroxybenzoate.

The α-olefin-maleic anhydride copolymer can be obtained by charging a reactor with the above materials and allowing the mixture to react at a temperature between about 70° C. and 180° C. for several hours.

The novel modified olefin resin of the present invention can be obtained by reacting the above α-olefin-maleic anhydride copolymer with at least one modifier having at least one functional group selected from the class consisting of hydroxyl, amino, aziridinyl and mercapto groups.

The modifier having a hydroxyl group is not specially limited if it has at least one hydroxyl group in the molecule. The modifier having a hydroxyl group is selected from primary, secondary and tertiary alcohols, oxyacids and nonionic emulsifiers. Examples of the alcohols include methanol, ethanol, propanol, isopropanol, butanol, sec-butanol, tert-butanol, pentanol, amyl alcohol, hexanol, heptanol, octanol, 2-ethylhexyl alcohol, nonanol, decanol, lauryl alcohol, myristyl alcohol, cetyl alcohol, stearyl alcohol, vinyl alcohol, allyl alcohol, oleyl alcohol, 2-hydroxyethyl acrylate, 2-hydroxyethyl methacrylate and 2-hydroxypropyl methacrylate. These alcohols may be used alone or in combination. Examples of the oxyacids include aliphatic oxyacids such as glycolic acid, lactic acid, α-oxybutyric acid, glyceric acid, tartronic acid, malic acid, citric acid and 12-hydroxystearic acid; aromatic oxyacids such as salicylic acid, m-oxybenzoic acid, p-oxybenzoic acid, gallic acid, mandelic acid and tropic acid; and oxyacids having a double bond in the molecule. In principle, any organic compounds having a carboxyl group and a hydroxyl group in the molecule may be used. In view of reactivity, aliphatic oxyacids are preferred. Examples of the nonionic emulsifiers include polyethylene glycol ester and polyethylene glycol ether. Further, a block polymer such as polyoxypropylene glycol ester or ether block polymers may be used. Specific examples of the nonionic emulsifiers include polyoxyethylene alkyl ether, polyoxyethylene alkylallyl ether, polyoxyethylene derivative, oxyethylene block copolymer, oxypropylene block copolymer, sorbitan aliphatic ester, polyoxyethylene sorbitan aliphatic ester, polyoxyethylene sorbitol aliphatic ester, glycerin aliphatic ester, polyoxyethylene aliphatic ester and polyoxyethylenealkylamine. Further, nonionic emulsifiers having a double bond in the molecule can be used.

The modifier having an amino group is not specially limited if it has at least one amino group in the molecule. The modifier having an amino group is selected from aliphatic amines, aromatic amines and amino acids. Examples of the aliphatic amines include methylamine, ethylamine, propylamine, isopropylamine, butylamine, isobutylamine, amylamine, hexylamine, heptylamine, octylamine, 2-ethylhexylamine, nonylamine, decylamine, laurylamine, myristylamine, cetylamine, stearylamine, allylamine, oleylamine, 3-methoxypropylamine, 3-ethoxypropylamine, 3-propoxypropylamine, 3-isopropoxypropylamine, 3-butoxypropylamine, 3-isobutoxypropylamine, 3-isobutoxypropylamine, 3-(2-ethylhexyloxy)propylamine, 3-decyloxypropylamine, 3-lauryloxypropylamine, 3-myristyloxypropylamine, dibutylaminopropylamine and dimethylaminoethoxypropylamine. Examples of the aromatic amines include aniline, o-toluidine, 2-ethylaniline, 2-fluoroaniline, o-anisidine, m-toluidine, m-anisidine, m-phenetidine, p-toluidine, 2,3-dimethylaniline and 5-aminoindane. These amines may be used alone or in combination. Examples of the amino acids include aliphatic amino acids such as glycine, alanine, valine, leucine, isoleucine, serine, threonine, cysteine, methionine, aspartic acid, glutamic acid, lysine, arginine, $\beta$-alanine and $\gamma$-aminobutyric acid; amino acids having an aromatic ring such as phenylalanine, typrosine, anthranilic acid, m-aminobenzoic acid and p-aminobenzoic acid; and amino acids having a heterocyclic ring such as histidine, tryptophane, proline and oxyproline. Any amino acids having a carboxyl group and an amino group in the molecule can be used.

The modifier having an aziridinyl group is not specially limited if it has at least one aziridinyl group in the molecule. Examples of the modifier having an aziridinyl group include aziridine compounds such as 2-(1-aziridinyl)ethanol acetate, 2-(1-aziridinyl)ethanol propionate, 2-(1-aziridinyl)-1-phenylethanol acetate, 2-(1-aziridinyl)-phenylethanol propionate, 2-methylaziridine, aziridine-2-carboxylic acid, methyl aziridine-2-carboxylate, ethyl aziridine-2-carboxylate, aziridine-2,3-dicarboxylic acid, dimethyl aziridine-2,3-dicarboxylate, diethyl aziridine-2,3-dicarboxylate. These aziridine compounds may be used alone or in combination.

The modifier having a mercapto group is not specially limited if it has at least one mercapto group in the molecule. Examples of the modifier having a mercapto group include methanethiol, ethanethiol, propanethiol, 2-propanethiol, 1-butanethiol, 1-methyl-1-propanethiol, 2-methyl-1-propanethiol, 2-methyl-2-propanethiol, 1-pentanethiol, cyclopentylmercaptan, 2-methyl-2-buthanethiol, 3-methyl-1-butanethiol, 1-hexanethiol, 1-octanethiol, 1-decanethiol and thiophenol. These compounds may be used alone or in combination.

The above modifiers may be used in combination. When a modified resin obtained by modification of the $\alpha$-olefin-maleic anhydride copolymer with a modifier having an $\alpha$, $\beta$-unsaturated double bond selected from the above modifiers is cured with ultraviolet light or electron beam, the resultant cured resin shows a remarkable improvement in physical properties such as wear resistance, anti-blocking properties, solvent resistance and heat resistance.

The reaction between the $\alpha$-olefin-maleic anhydride copolymer and the modifier may be carried out in the presence or absence of a solvent. A catalyst may be used as required. Examples of the catalyst include triethylamine, pyridine, dimethylbenzylamine and p-toluenesulfonic acid. When the modifier has a polymerizable double bond, the reaction is carried out preferably in the presence of a polymerization inhibitor such as hydroquinone, phenothiazine, or the like.

The modified olefin resin can be obtained by charging a reactor with the $\alpha$-olefin-maleic anhydride copolymer and the above modifier and allowing them to react at a temperature between about 70° C. and 250° C. for several hours.

The acid value of the modified olefin resin is at least 30, preferably 80 or more. A modified resin having an acid value of less than 30 hardly shows alkali solubility and water compatibility. In order to retain the hot-meltability of the modified olefin resin, the acid value thereof is preferably not more than 300.

When the $\alpha$-olefin-maleic anhydride copolymer is modified by the above reaction, the modified resin having excellent hot-meltability, alkali-solubility and pigment dispersibility in combination can be synthesized. The so-obtained modified resin can be easily applied as a hot-melt product, and the applied modified resin can be easily dissolved and removed with an alkaline aqueous solution. Further, the above modified resin can be easily rendered water-compatible by neutralizing it with an alkali component. Therefore, the above modified resin can be used in a water-compatible adhesive, a water-compatible ink and a water-compatible coating composition.

Examples of the above alkali component include hydroxides and organic amines such as sodium hydroxide, potassium hydroxide, lithium hydroxide, ammonia water, triethylamine and triethanolamine.

The modified resin of the present invention has excellent alkali-solubility, hot-meltability and pigment dispersibility by itself, and can be used in an alkali-soluble hot-melt adhesive, a water-compatible adhesive, a water-compatible ink and a water-compatible coating composition.

The modified resin of the present invention may contain a transition metal having a valence of at least 2, an olefin resin and/or a tackifier in order to obtain an ink, an adhesive and a coating composition having proper adhesiveness, adhesion to a substrate, flexibility or printability.

Further, an adhesive having improved adhesiveness and flexibility, a water-compatible ink having improved printability and a water-compatible coating composition having improved adhesion to a film, etc., can be obtained by polymerizing a monomer having an α, β-unsaturated double bond (excluding the α-olefin having at least 6 carbon atoms and maleic anhydride) in the presence of the modified resin of the present invention (the so-obtained adhesive, ink and coating composition are sometimes generally referred to as "resin composition-1" hereinafter). Examples of the above monomer having an α, β-unsaturated double bond are as follows.

(1) Acrylic acid and methacrylic acid.

(2) Acrylic esters and methacrylic esters having an alkyl group having 1 to 18 carbon atoms such as methyl acrylate, ethyl acrylate, n-butyl acrylate, isobutyl acrylate, tert-butyl acrylate, 2-ethylhexyl acrylate, lauryl acrylate, tridecyl acrylate, stearyl acrylate, cyclohexyl acrylate, methyl methacrylate, ethyl methacrylate, propyl methacrylate, n-butyl methacrylate, isobutyl methacrylate, tert-butyl methacrylate, 2-ethylhexyl methacrylate, lauryl methacrylate, stearyl methacrylate and cyclohexyl methacrylate.

(3) Hydroxylalkyl acrylates and hydroxyl methacrylates having an alkyl group having 2 to 12 carbon atoms such as 2-hydroxyethyl acrylate, 2-hydroxypropyl acrylate, 3-hydroxypropyl acrylate, 5-hydroxyamyl acrylate, 6-hydroxyhexyl acrylate, 8-hydroxyoctyl acrylate, 10-hydroxydecyl acrylate, 2-hydroxyethyl methacrylate, 3-hydroxypropyl methacrylate, 5-hydroxyamyl methacrylate, 6-hydroxyhexyl methacrylate, 8-hydroxyoctyl methacrylate and 10-hydroxydecyl methacrylate. The alkyl groups of these may have other substituents such as amino, epoxy, halide, nitrile and amide groups.

(4) Vinyl monomers having a hydrolyzable silyl group, silicon acrylate, silicon methacrylate, fluorine acrylate, fluorine methacrylate, acrylonitrile, styrene, vinyltoluene, methacrylonitrile, itaconic acid dialkyl ester, fumaric acid dialkyl ester, allyl alcohol, acryl chloride, vinyl acetate, vinyl chloride, vinylidene chloride, vinylpirydine, vinylpyrrolidone, methyl vinyl ketone and rosin having a double bond.

The amount of the above monomer having an α, β-unsaturated double bond (excluding the α-olefin and maleic anhydride) per 100% by weight of the modified resin is preferably 5 to 100% by weight. When the resin composition-1 is used as an alkali-soluble hot-melt adhesive or a water-compatible adhesive, the above amount is particularly preferably 20 to 50% by weight. When the resin composition-1 is used in a water-compatible ink or a water-compatible coating composition, the above amount is particularly preferably 20 to 100% by weight. When the above amount exceeds 100% by weight, it is difficult to impart the resin composition-1 with excellent alkali-solubility and hot-meltability at the same time. Further, it is difficult to impart the resin composition-1 with dispersibility in water.

Further, the resin composition-1 may be obtained by dissolving the modified olefin resin in an organic solvent and then adding a solution of the above monomer and a polymerization initiator dropwise to polymerize them. The resin composition-1 may be also obtained by polymerizing the above monomer in the presence of the modified olefin resin which has been preliminarily rendered water-compatible with an alkali component. Further, the polymerization may be carried out in the absence of a solvent. By properly selecting the synthesis conditions for this polymerization, a solution-type resin composition-1, a water-dispersible resin composition-1 and a solventless resin composition-1 can be obtained, and there can be obtained a resin composition-1 having a freely adjusted solid content and viscosity. When the polymerization is carried out in an organic solvent having a solubility parameter of 8.3 or less, a so-called nonaqueous dispersion resin is obtained. An initiator used for the polymerization is selected from generally usable initiators. Examples of the initiator used for the polymerization include azo compounds such as azobisisobutyronitrile, azobis-2,4-dimethylvaleronitrile and 4,4'-azobis(4-cyanovaleric acid), organic peroxides such as benzoyl peroxide and lauroyl peroxide, and water-soluble initiators such as ammonium persulfate, potassium persulfate and 2,2'-azobis(2-methylpropionamidine).dihydrochloride.

The modified resin and the resin composition-1 of the present invention may further contain a transition metal compound having a valence of at least 2. When the modified resin or the resin composition-1 is used with a transition metal compound having a valence of at least 2 in an adhesive, a water-compatible ink or a water-compatible coating composition, a metal ion chelating with a carboxylic acid derived from an anhydride group takes place, and the cohesion of the adhesive and the water resistance of the ink and the coating composition are improved. Examples of the transition metal compound having a valence of at least 2 include hydroxides, oxides, acetates, acetyl acetates and alkoxy metal compounds of zinc, calcium, magnesium, aluminum and titanium.

The amount of the above transition metal compound having a valence of at least 2 based on a carbonyl group of the modified resin is preferably 0.1 to 10 equivalent %, particularly preferably 0.1 to 5 equivalent %. When this amount exceeds 10 equivalent %, it is difficult to obtain a hot-melt adhesive or a water dispersion having proper fluidity.

The modified resin and the resin composition-1 may also further contain an olefin resin. The modified resin and the resin composition-1 have excellent compatibility with an olefin resin. When the modified resin and the resin composition-1 are used with an olefin resin, they show an improvement in adhesiveness and flexibility as an adhesive and adhesion to a film, etc., as a water-compatible ink and a water-compatible coating composition. Examples of the above olefin resin include a polypropylene resin, a polyethylene resin, a polyethylene-vinyl acetate resin, a polyethylene-vinyl alcohol resin, a maleinated polypropylene resin, a maleinated polyethylene resin, chlorinated polyethylene, chlorinated polypropylene, hydrocarbon wax, chlorinated paraffin, polyethylene wax, polyisobutylene and polyterpene resin. Examples of the above olefin resin further include modified polyolefin resins having amino, epoxy, halide, nitrile, chlorosulfone and amide groups, alkoxysilane-modified polyolefins, silicon-modified polyolefins and fluorinated polyolefins.

The amount of the above olefin resin for use per 100% by weight of the modified resin or the modified resin in the resin composition-1 is preferably 1 to 100% by weight. When a composition containing either the modified resin or the resin composition-1 and the olefin resin is used in an alkali-soluble hot-melt adhesive or a water-compatible adhesive, the amount of the olefin resin is preferably 20 to 50% by weight. When the above composition is used in a water-comptible ink or a water-compatible coating composition, the amount of the olefin resin is preferably 1 to 20% by weight. When the amount of the olefin resin exceeds 100% by weight, it is difficult to obtain proper alkali-solubility, water dispersibility or stability of an aqueous dispersion.

A composition of the modified resin and the olefin resin may be produced by adding the olefin resin while the α-olefin and maleic anhydride are copolymerized, by incorporating the olefin resin into the modified resin, or by preparing a composition of the α-olefin-maleic anhydride copolymer and the olefin resin before modification. For example, the composition of the modified resin and the olefin resin can be produced by a method in which the modified resin is dissolved in an organic solvent, the olefin resin is added, and the resultant solution is heated at a temperature between 70° C. and 240° C. The above method can be properly selected depending upon materials and use. In this case, a tertiary amine and peroxide may be added to the above solution before heating. The reaction may be carried out in the absence of a solvent.

The modified resin has good compatibility with the olefin resin. The reason therefor is considered as follows. A graft reaction takes place between the modified resin and the olefin resin in the presence of a peroxide and a mutual action occurs between a carboxyl group derived from maleic anhydride and the olefin resin. The main reason is basically presumably in a mutual action between an α-olefin branch in the modified resin and the olefin resin.

The modified resin and the resin composition-1 of the present invention may further contain a tackifier resin. A composition containing either the modified resin or the resin composition-1 and a tackifier resin shows an improvement in adhesiveness of an adhesive and laminate strength of a water-compatible ink. Examples of the tackifier resin include natural tackifiers and their derivatives such as gum rosin, tall oil rosin, wood rosin, hydrogenated rosin, disproportionation rosin, a rosin polymer, rosin glycerin ester and hydrogenated rosin pentaerythritol ester; synthetic resins such as a petroleum resin, a coumarone-indene resin, a styrene resin, a phenolic resin and xylene resin.

The amount of the above tackifier resin per 100% by weight of the modified resin or the modified resin in the resin composition-1 is preferably 1 to 100% by weight. When a composition containing either the modified resin or the composition-1 and the tackifier resin is used in an alkali-soluble adhesive or a water-compatible adhesive, this amount is particularly preferably 20 to 50% by weight. When the above composition is used in a water-compatible ink or a water-compatible coating composition, the above amount is particularly preferably 1 to 5% by weight. When the above amount exceeds 100% by weight, it is difficult to obtain proper alkali-solubility, water dispersibility or water dispersion stability.

The modified resin and the resin compositions described so far, provided by the present invention, may further contain additives such as a pigment, a filler, a plasticizer, a pigment dispersant, a solvent, a thickener, an antiseptic, an antifoaming agent and a leveling agent as required.

The modified resin and resin composition of the present invention can be widely used in solventless or water-compatible adhesives, coating compositions, etc., such as a hot-melt adhesive, a solventless adhesive, a water-compatible adhesive, a water-compatible ink and a water-compatible coating composition which all have resolubility in an alkaline solution. The modified resin and resin composition of the present invention is therefore industrially very useful.

The present invention will be described further in detail by reference to Examples.

EXAMPLE 1

A flask was charged with 757 g of 1-octadecene, 2.7 g of di-tert-butyl peroxide and 10 g of toluene, and flushed with nitrogen. While the mixture in the flask was heated at 150° C. and stirred, 294 g of maleic anhydride was added at a rate of 9.8 g at intervals of 2 minutes and 2.1 g of di-tert-butyl peroxide was added at a rate of 0.7 g at intervals of 20 minutes. After the addition, the reaction mixture was further allowed to react for 6 hours by keeping the temperature of the reaction system at 170° C. Further, 361 g of 12-hydroxystearic acid was added, and the resultant mixture was allowed to react at 180° C. for 6 hours. After the reaction finished, the reaction product was withdrawn from the flask while it was hot, and solidified by cooling it to give a resin having a weight average molecular weight of 20,000 (as a polystyrene).

EXAMPLE 2

A flask was charged with 1,276 g of DIALEN 208, 3.6 g of di-tert-butyl peroxide and 14 g of toluene, and flushed with nitrogen. While the mixture in the flask was heated at 150° C. and stirred, 392 g of maleic anhydride was added at a rate of 13.1 g at intervals of 2 minutes and 1.8 g of di-tert-butyl peroxide was added at a rate of 0.9 g at intervals of 20 minutes. After the addition, 1 g of di-tert-butyl peroxide was further added, and the reaction mixture was further allowed to react for 6 hours by keeping the temperature of the reaction system at 170° C. After the reaction finished, 312 g of 2-hydroxyethyl methacrylate, 10 g of triethylamine and 1 g of hydroquinone were added, and the resultant mixture was allowed to react at 90° C. for 5 hours to give a resin having a weight average molecular weight of 24,000 (as a polystyrene). Thereafter, 544 g of ammonia water was added, and then 4,076 g of water was added to the above resin to give a water-compatible dispersion resin having a solid content of 29.8%.

EXAMPLE 3

A flask was charged with 757 g of 1-octadecene, 2.7 g of di-tert-butyl peroxide and 10 g of toluene, and flushed with nitrogen. While the mixture in the flask was heated at 150° C. and stirred, 294 g of maleic anhydride was added at a rate of 9.8 g at intervals of 2 minutes and 2.1 g of di-tert-butyl peroxide was added at a rate of 0.7 g at intervals of 20 minutes. After the addition, the reaction mixture was further allowed to react for 6 hours by keeping the temperature of the reaction system at 170° C. Further, 78.1 g of 2-ethylhexyl alcohol was added, and the resultant mixture was allowed to react at 170° C. for 6 hours and at 220° C. for 10 hours to give a resin having a weight average molecular weight of 23,000 (as a polystyrene). Thereafter, 226 g of Bondine AX8060 (polyethylene-based resin, supplied by Sumitomo Chemical Co., Ltd.) was added to the resin, and the resultant mixture was stirred under heat at 150° C. for 2 hours. Then 367.2 g of 25% ammonia water and 2,796 g of water was added to give a water-compatible dispersion resin having a solid content of 29.5%.

EXAMPLE 4

A flask was charged with 1,276 g of DIALEN 208, 3.6 g of di-tert-butyl peroxide and 14 g of toluene, and flushed with nitrogen. While the mixture in the flask was heated at 150° C. and stirred, 392 g of maleic anhydride was added at a rate of 13.1 g at intervals of 2 minutes and 1.8 g of di-tert-butyl peroxide was added at a rate of 0.9 g at intervals of 20 minutes. After the addition, 1 g of di-tert-butyl peroxide was further added, and the reaction mixture was further allowed to react for 6 hours by keeping the temperature of the reaction system at 170° C. Further, 37.3 g of aniline was added, and while water was removed from the system, the reaction mixture was allowed to react at 180° C. for 5 hours to give a resin having a weight average molecular weight of 22,000 (as a polystyrene). Thereafter, 427.3 g of Bondine AX8060 (supplied by Sumitomo Chemical Co., Ltd.) was added to the resin, and the resultant mixture was heated at 170° C. for 2 hours. Then, 61.3 g of tetrabutoxytitanium was added, and the resultant mixture was heated at 170° C. for 2 hours. The reaction product was withdrawn while it was hot, and solidified by cooling it.

EXAMPLE 5

A flask was charged with 1,350 g of DIALEN 30, 2.7 g of di-tert-butyl peroxide and 14 g of toluene, and flushed with nitrogen. Then, while the mixture in the flask was heated at 150° C. and stirred, 294 g of maleic anhydride was added at a rate of 9.8 g at intervals of 2 minutes and 2.1 g of di-tert-butyl peroxide was added at a rate of 0.7 g at intervals of 20 minutes. After the addition, the reaction mixture was further allowed to react for 6 hours by keeping the temperature of the reaction system at 170° C. Further, 177 g of glutamic acid was added, and while water was removed from the system, the reaction mixture was allowed to react at 180° C. for 5 hours to give a resin having a weight average molecular weight of 24,000 (as a polystyrene). 20 Grams of this resin and 20 g of an ethylene-vinyl acetate resin were added to a kneader and stirred under heat at 80° C. for 1 hour. Then, 5.4 g of triethylamine and 4.5 g of water were added, and the resultant mixture was stirred under heat at 80° C. for 1 hour. Finally, 83.4 g of water was added to the reaction mixture to give a water-compatible dispersion resin having a solid content of 29.1%.

EXAMPLE 6

A flask was charged with 1,350 g of DIALEN 30. 2.7 g of di-tert-butyl peroxide and 14 g of toluene, and flushed with nitrogen. Then, while the mixture in the flask was heated at 150° C. and stirred, 294 g of maleic anhydride was added at a rate of 9.8 g at intervals of 2 minutes and 2.1 g of di-tert-butyl peroxide was added at a rate of 0.7 g at intervals of 20 minutes. After the addition, the reaction mixture was further allowed to react for 6 hours by keeping the temperature of the reaction system at 170° C. Further, 950 g of polyoxyethylene nonylphenyl ether having a cloud point of 90° C. was added, and the reaction mixture was further allowed to react at 180° C. for 6 hours to give a resin having a weight average molecular weight of 23,000 (as a polystyrene). Thereafter, 908 g of Bondine AX8060 (supplied by Sumitomo Chemical Co., Ltd.) and 649 g of rosin ester having a softening point of 80° to 90° C. were added, and the resultant mixture was stirred under heat at 150° C. for about 2 hours. The reaction product was withdrawn while it was hot, and solidified by cooling it.

EXAMPLE 7

A flask was charged with 452 g of Bondine AX8060, 1,276 g of DIALEN 208, 3.6 g of di-tert-butyl peroxide and 14 g of toluene, and flushed with nitrogen. Then, while the mixture in the flask was heated at 150° C. and stirred, 392 g of maleic anhydride was added at a rate of 13.1 g at intervals of 2 minutes and 1.8 g of di-tert-butyl peroxide was added at a rate of 0.9 g at intervals of 20 minutes. After the addition, the reaction mixture was further allowed to react for 6 hours by keeping the temperature of the reaction system at 170° C. Further, 134 g of decanethiol was added, and reaction mixture was allowed to react at 180° C. for 6 hours to give a resin. Then, 800 g of this resin was melted at 150° C., and after 2 g of di-tert-butyl peroxide was added, 50 g of methacrylic acid and 150 g of butyl methacrylate were added dropwise over 1 hour. After the addition, 1 g of di-tert-butyl peroxide was added, and the reaction mixture was further allowed to react for 6 hours by keeping the temperature of the system at 160° C. The reaction product was withdrawn while it was hot, and solidified by cooling it.

EXAMPLE 8

A flask was charged with 1,276 g of DIALEN 208, 3.6 g of di-tert-butyl peroxide and 14 g of toluene, and flushed with nitrogen. Then, while the mixture in the flask was heated at 150° C. and stirred, 392 g of maleic anhydride was added at a rate of 13.1 g at intervals of 2 minutes and 1.8 g of di-tert-butyl peroxide was added at a rate of 0.9 g at intervals of 20 minutes. After the addition, the reaction mixture was further allowed to react for 6 hours by keeping the temperature of the reaction system at 170° C. Further, 80.9 g of aziridine-2-carboxylic acid methyl ester was added, and reaction mixture was allowed to react at 180° C. for 5 hours to give a resin having a weight average molecular weight of 22,000 (as a polystyrene). 10 Grams of rosin ester having a softening point of 80° to 90° C. was added to 500 g of the above resin, and after the mixture was stirred under heat at 150° C. for 2 hours, 145 g of 25% ammonia water was added. 1978 Grams of water was added, 1 g of ammonium persulfate was added, and the temperature of the mixture was increased up to 80° C. Then, 200 g of methyl methacrylate and 200 g of 2-ethylhexyl acrylate were added dropwise over 2 hours. Thereafter, the reaction mixture was further allowed to react for 2 hours to give a water-compatible dispersion resin having a solid content of 30.1%.

COMPARATIVE EXAMPLE 1

A flask was charged with 100 g of Bondine AX8060 (supplied by Sumitomo Chemical Co., Ltd.) and 100 g of rosin ester having a softening point of 80° to 90° C., and the mixture was stirred at 170° C. for 2 hours. The content was withdrawn while it was hot, and solidified by cooling it.

COMPARATIVE EXAMPLE 2

A flask was charged with 40 g of methyl methacrylate, 30 g of ethyl acrylate, 30 g of acrylic acid, 100 g of dioxane and 1.5 g of benzoyl peroxide, and flushed with nitrogen. The resultant mixture in the flask was stirred under heat at 80° C. After 1 hour, 0.5 g of benzoyl peroxide was further added, and further stirred under heat at 80° C. for 2 hours. Thereafter, 50 g of a polyethylene-vinyl acetate resin was added, and the resultant mixture was heated at 80° C. for 2 hours. After the reaction, 25.2 g of ammonia water was added, then 425 g of water was added, 200 g of the solvent was removed at 100° C. for 6 hours to give a water-compatible dispersion resin having a solid content of 28.8%.

COMPARATIVE EXAMPLE 3

A flask was charged with 50 g of an ethylene-vinyl acetate resin, 10 g of carnauba wax and 40 g of rosin ester having a softening point of 80° to 90° C., and the resultant mixture in the flask was heated at 180° C. and mixed for 2 hours. Then, the contents were withdrawn while they were hot, and cooled into a solid.

COMPARATIVE EXAMPLE 4

A flask was charged with 50 g of methyl methacrylate, 40 g of ethyl acrylate, 10 g of acrylic acid, 100 g of isopropyl alcohol and 1.5 g of benzoyl peroxide, and flushed with nitrogen. Then, the resultant mixture was stirred under heat at 80° C. After 1 hour, 0.5 g of benzoyl peroxide was added, and the resultant mixture was stirred under heat at 80° C. for 2 hours. After the reaction, 8.4 g of ammonia water was added, 330 g of water was added, 200 g of the solvent was removed at 100° C. for 5 hours to give a water-compatible dispersion resin having a solid content of 28.2%.

COMPARATIVE EXAMPLE 5

A flask was charged with 700 g of water and 2 g of sodium dodecylbenzenesulfonate, and flushed with nitrogen. The mixture in the flask was heated up to 80° C. 0.75 Gram of potassium persulfate was dissolved, and a mixed monomer solution containing 150 g of methyl methacrylate, 145 g of 2-ethylhexyl acrylate and 5 g of acrylic acid was added dropwise over 1 hour. After the addition, 0.25 g of potassium persulfate was added, and the resultant mixture was stirred under heat at 80° C. for 2 hours to give a water-compatible dispersion resin having a solid content of 29.4%.

Table 1 shows the adhesion shear strength, alkali solubility and pigment dispersibility of each of the resins or resin compositions obtained in Examples 1 to 8 and Comparative Examples 1 to 5.

TABLE 1

| | Adhesion shear strength (kg/cm$^2$) Note 1 | Solubility in alkali Note 2 | Storage stability Note 3 | Pigment dispersibility Note 4 |
|---|---|---|---|---|
| Ex-1 | 6.7 or higher | dissolved | — | excellent |
| Ex-2 | 5.5 or higher | — | excellent | excellent |
| Ex-3 | 6.2 or higher | — | excellent | excellent |
| Ex-4 | 6.5 or higher | dissolved | — | excellent |
| Ex-5 | 5.9 or higher | — | excellent | excellent |
| Ex-6 | 6.3 or higher | dissolved | — | excellent |
| Ex-7 | 6.1 or higher | dissolved | — | excellent |
| Ex-8 | 6.3 or higher | — | excellent | excellent |
| CEx-1 | 5.9 or higher | not dissolved | — | poor |
| CEx-2 | 3.4 | — | precipitated | poor |
| CEx-3 | 6.5 higher | not dissolved | — | poor |
| CEx-4 | 3.3 | — | good | poor |
| CEx-5 | 4.0 | — | good | poor |

Ex = Example, CEx = Comparative Example

Note 1: Tested according to JIS K6850 with a piece of corrugated paper as a test piece. Each of the resins obtained in Examples 1, 4, 6 and 7 and Comparative Examples 1 and 3 was, separately from the others, melted at 180° C., and applied to a test piece with a spatula.

Note 2: Tested by dissolving each sample in a 0.1N sodium hydroxide aqueous solution at 60° C.

Note 3: A resin solution was allowed to stand at 40° C. for 1 week, and a phase separation state of the resin solution was visually examined.

Note 4: Each solid resin was dissolved in toluene in the resin/toluene mixing ratio of 50 parts/50 parts. 10 Parts of Phthalocyanine Blue and 60 parts of glass beads having an average diameter of 15 mm was added to 100 parts of each resin solution, and dispersed with a paint conditioner for 20 minutes, and the resultant was allowed to stand at 50° C. for 1 week and measured for a storage stability value with a precipitation tube.

What is claimed is:

1. A modified olefin resin which is capable of being rendered water-compatible by neutralization with an alkali and having an acid value of at least 30, which is produced by reacting a copolymer obtained from an α-olefin having at least 6 carbon atoms and maleic anhydride with at least one modifier selected from the group consisting of a compound having a hydroxyl group and a carboxyl group and a compound having an amino group and a carboxyl group.

2. A modified resin according to claim 1 wherein the α-olefin has at least 10 carbon atoms.

3. A modified resin according to claim 1 wherein the modifier is a compound having a hydroxyl group and a carboxyl group.

4. A modified resin according to claim 1 wherein the modifier is an amino acid.

* * * * *